United States Patent
Gonder et al.

(10) Patent No.: US 7,532,712 B2
(45) Date of Patent: May 12, 2009

(54) SYSTEM AND METHOD FOR PROVIDING CALLER ID SERVICE IN A MULTI-REGION CABLE NETWORK

(75) Inventors: Tom Gonder, Westminster, CO (US);
Scott Ramsdell, Charlotte, NC (US);
Howard Pfeffer, Reston, VA (US);
Matthew Cannon, Sterling, VA (US);
James Balasalle, Boulder, CO (US);
Albert Straub, Westminster, CO (US)

(73) Assignee: Time Warner Cable, Inc., New York, NY (US)

( * ) Notice: Subject to any disclaimer, the term of this patent is extended or adjusted under 35 U.S.C. 154(b) by 952 days.

(21) Appl. No.: 11/001,444

(22) Filed: Dec. 1, 2004

(65) Prior Publication Data

US 2006/0115062 A1 Jun. 1, 2006

(51) Int. Cl.
*H04M 1/56* (2006.01)
*H04M 15/06* (2006.01)

(52) U.S. Cl. .............. 379/142.17; 379/142.01; 379/142.07; 379/142.15; 379/142.16; 709/238; 709/240; 370/352

(58) Field of Classification Search ............ 379/142.01, 379/142.04, 142.09, 142.13, 142.14, 142.15, 379/142.16, 142.17, 245, 247; 370/352–356; 709/238, 240, 245, 231–232

See application file for complete search history.

(56) References Cited

U.S. PATENT DOCUMENTS

| 5,754,546 | A | | 5/1998 | Voit et al. | |
|---|---|---|---|---|---|
| 5,825,862 | A | * | 10/1998 | Voit et al. | 379/142.16 |
| 7,385,992 | B1 | * | 6/2008 | Koch et al. | 370/401 |
| 2003/0033605 | A1 | | 2/2003 | Bartfeld | |
| 2003/0086432 | A1 | | 5/2003 | Bartfeld et al. | |
| 2005/0249344 | A1 | * | 11/2005 | Mueller et al. | 379/207.15 |
| 2006/0039545 | A1 | * | 2/2006 | Rahman et al. | 379/142.01 |

FOREIGN PATENT DOCUMENTS

WO WO 00/44173 1/2000

* cited by examiner

*Primary Examiner*—Binh K Tieu
(74) *Attorney, Agent, or Firm*—The Marbury Law Group, PLLC (57) ABSTRACT

A system and method for providing caller ID in a multi-region cable network. Caller identifying (CID) information of an incoming VoIP call is provided to a digital telephone subscriber through a video termination device (VTD) using a path that is different from the path by which the VoIP call packets are delivered to the digital telephone subscriber. The telephone number of a digital telephone subscriber is associated with the IP address and/or MAC address of the subscriber's VTD. The called number of the incoming VoIP call is used to select the VTD to which the CID information is delivered. A message is then sent through an out-of-band to the digital telephone subscriber's VTD comprising the CID information for display on video display equipment. Alternatively, the VTD is DOCSIS-compliant and a message is addressed to the VTD using the IP address of the VTD DOCSIS modem.

67 Claims, 6 Drawing Sheets

SYSTEM AND METHOD FOR PROVIDING CALLER ID SERVICE IN A MULTI-REGION CABLE NETWORK

BACKGROUND

Hybrid Fiber Coax (HFC) cable networks were originally built to deliver broadcast-quality TV signals to homes. The wide availability and extremely wide bandwidth of these systems led to the extension of their functionality to include delivery of high-speed broadband data signals to end-users. Data over Cable System Interface Specifications (DOCSIS), a protocol developed under the leadership of Cable Television Laboratories, Inc., has been established as the major industry standard for two-way communications over HFC cable plants.

Large cable networks comprise distributed video and data facilities. In a typical network architecture, video is distributed to subscribers in geographically segmented markets via a dedicated headend that services multiple hubs and nodes. Regional data centers support multiple headends through separate fiber links. Coordination of subscriber video services and subscriber data services (e.g., e-mail, web browsing, VoIP) is required for billing purposes and, increasingly, to provide cross-over services that use both video facilities and data facilities. For example, video terminating equipment (the "set top box" or "STB") providing subscribers access to e-mail, web-browsing, and voice services.

Telephone communications are not always desirable, or may not be desirable at a particular time. A television viewer who is enjoying programming often must choose between continuing a program and answering an incoming telephone call. A call may simply be ignored, but without some knowledge of the caller, the television viewer who ignores an incoming call is assuming the risk that the call is important. A television viewer with an answering device may elect to have the call answered by the answering device and "screen" the call if the calling party elects to leave a message. However, the cable subscriber cannot be assured that the calling party will leave a message. Further, given that attention must be diverted from programming to screen the call, the screening option is only marginally better than answering the call.

Service providers have attempted to deal with the conflict between viewing television programming and answering incoming telephone calls by marrying conventional caller ID service with the STB. Caller ID services offered over conventional telephones became viable with the widespread adoption of digital exchanges using a separate call data circuit. Standards for this circuit were adopted internationally with the development of Signaling System 7 (SS7), which is now the standard for connecting public switched telephone networks (PSTNs) world-wide. SS7 allows a caller's exchange to send a Calling Party Number Message (CPNM or CPN), which includes the number of the caller and whether or not the caller wants its number to be blocked. The CPNM is passed all the way to the called party's exchange, where the CPNM is translated into the local form of Caller ID, and blocking is applied if necessary.

AOLTV, WebTV and DirecTV connect the STB to the PSTN to acquire caller ID information. The STB displays the caller ID information on the television screen. While this approach has some limited value, it requires an additional connection between the STB and the interface to the PSTN (typically, a telephone jack connected to inside wiring that terminates at the local loop) that is separate from the video source (cable, satellite, or broadcast). Additionally, for conventional caller ID service to work, the two parties must be on digital exchanges that are linked by SS7. Thus, a cable television viewer who is also a subscriber to VoIP services provided over a cable system cannot use a conventional caller ID service.

What would be useful are systems and methods for displaying a caller ID of an incoming VoIP call on a video display connected to, or integrated with, a video termination device that is connected to a multi-region cable network. The systems and methods would provide means for associating a called number with a video termination device regardless of the location of that device within the multi-region cable network.

SUMMARY

In an embodiment of the present invention, caller identifying (CID) information of an incoming VoIP call is provided to a digital telephone subscriber within a multi-region cable network (MRCN). In an embodiment of the present invention, CID information comprises the calling party's telephone number. In another embodiment of the present invention, the CID information further comprises an identifying label that is programmable by the subscriber. By way of illustration and not as a limitation, the subscriber may elect to display the caller's telephone number, the subscriber-defined label, or both.

In an exemplary embodiment, the caller identifying information is provided to a video termination device (VTD) using a path that is different from the path by which the VoIP call packets are delivered to the digital telephone subscriber. In an embodiment of the present invention, a VTD comprises a standalone set top box (STB). However, this is not meant as a limitation. For example, a VTD performing the communication functions of an STB may be incorporated into a cable-ready television with the security and access functions performed by an external PCMCIA type card. See, OpenCable™ Multistream CableCARD Interface Specification OC-SP-MC-IF-I02-040831.

A telephone call is received at a soft switch comprising a feature set for providing caller ID service to VTDs. When a called subscriber has the feature enabled, the soft switch generates a SIP INVITE message and sends the message conveying the CID information to a SIP proxy server. The SIP proxy server receives the INVITE message from the soft switch and relays the INVITE message to CID servers located in the headends served by the regional data center in which the soft switch resides.

A CID server obtains a list of digital telephone subscribers that receive video services via the MRCN. The digital telephone subscriber list correlates a subscriber's telephone number(s) and a set of VTD MAC addresses assigned to that subscriber. A VTD comprises a CID client that registers with the CID server by providing the CID server a "read" MAC address and an IP address of the VTD. The CID server matches an "assigned" VTD MAC address to the "read" VTD MAC address, then creates a tuple associating the subscriber telephone number(s), read MAC address, and IP address of the VTD.

Each CID server that receives the INVITE message determines whether the subscriber associated with the called number is registered with that CID server. In an embodiment of the present invention, this determination is accomplished by matching the called telephone number to the subscriber telephone number-read VTD MAC address-VTD IP address tuple maintained by the CID server. If the called number matches a telephone number in the tuple created by the CID server, the CID information is sent in the form of a CID message addressed to the subscriber's VTD through an out-of-band channel/path to the digital telephone subscriber's VTD to a CID client residing in the VTD for processing and display. In an alternate embodiment of the present invention, the CID message is sent through an in-band channel/path to the digital telephone subscriber's CID client for processing and display.

In another embodiment of the present invention, an MTA-cable modem is integrated into a VTD. In this embodiment, the soft switch communicates directly with the MTA without the need to separately identify the location of the VTD. In response to an incoming call, the CID information is received by the MTA in the digital signaling component of the communication between the soft switch and the MTA. The MTA provides the CID information to a CID client residing in the VTD for processing and display to the subscriber.

It is therefore an aspect of the present invention to provide CID information to a video termination device in a MRCN.

It is another aspect of the present invention to locate a video termination device in a MRCN and to provide CID information to that video termination device.

It is yet another aspect of the present invention to use a proxy server to route CID information to CID servers for processing.

It is an aspect of the present invention to establish a central datastore within a MRCN in which the telephone numbers of a digital telephone subscriber are associated with the VTD MAC address(es) assigned to that subscriber. Additionally, it is an aspect of the present invention to register the "read" MAC address and IP address of each VTD with a CID server. The CID server matches assigned MAC addresses to "read" MAC addresses and creates a correlated list of digital telephone subscriber telephone numbers, VTD MAC addresses, and VTD IP addresses, thereby allowing CID information to be directed to the appropriate VTD.

It is another aspect of the present invention to adapt CID servers to determine whether CID information is intended for a video termination device registered with a particular CID server and to assign that particular CID server the responsibility for routing the CID information to the registered video termination device.

It is still another aspect of the present invention to adapt a CID client residing within a video termination device to reject CID information sent to the CID client in error.

These and other aspects of the present invention will be apparent from a review of the general and detailed descriptions that follow.

In an embodiment of the present invention, a system for providing caller ID service in a multi-region cable network comprises a plurality of headends each comprising a caller ID (CID) server and a regional data center comprising a soft switch and a SIP proxy server. The plurality of headends provides video services to subscribers. The regional data center provides digital services to the subscribers of the plurality of headends. In this embodiment, the SIP proxy server receives an invitation message from the soft switch, wherein the invitation message comprises identifying information of a calling party and identifying information of a called party and forwards the invitation message to the CID server. In an embodiment of the present invention, the SIP proxy server receives an "OK" response from a CID server with which the called party has registered and sends a cancellation message to CID servers from which the "OK" response is not received.

In an embodiment of the present invention, the invitation message uses the session initiation protocol.

In embodiment of the present invention, the identifying information of the calling party comprises a caller telephone number. In another embodiment of the present invention, the identifying information of the calling party comprises a caller name. In still another embodiment of the present invention, the identifying information of the calling party identifies a call as originating from a facsimile machine. In an embodiment of the present invention, the identifying information of the called party comprises a called telephone number.

The CID server parses the invitation message to obtain the identifying information of the calling party and the identifying information of the called party, creates a CID message comprising the identifying information of the calling party, and sends the identifying information of the calling party over a transmission path to a video termination device of the called party for display on a video display device. In an embodiment of the present invention, the CID server sends the SIP proxy server the "OK" response message comprising an acknowledgement of the invitation message.

In an embodiment of the present invention, the transmission path conveys both video and data and the video display device displays the identifying information of the calling party and video. In another embodiment of the present invention, the video display device displays the identifying information of the calling party.

In an embodiment of the present invention, the transmission path comprises an in-band channel. In another embodiment of the present invention, the transmission path is an out-of-band channel. In still another embodiment of the present invention, the out-of-band channel is an RF channel. In yet another embodiment of the present invention, the out-of-band channel is a DOCSIS-compliant channel.

In an embodiment of the present invention, the video termination device comprises a set top box. In another embodiment of the present invention, the video termination device is integrated into a cable-ready video display device.

In an embodiment of the present invention, the multi-region cable network further comprises a central datastore comprising a first tuple comprising a subscriber telephone number and an assigned video termination device MAC address. The CID server receives the first tuple from the central datastore, receives a second tuple from the video termination device comprising a read video termination device MAC address and a video termination device IP address. The CID server determines whether the assigned video termination device MAC address matches the read video termination device MAC address. If the assigned video termination device MAC address matches the read video termination device MAC address, then the CID server creates a third tuple comprising the subscriber telephone number and the video termination device IP address. In another embodiment of the present invention, the third tuple further comprises the read video termination device MAC address.

The CID server determines whether the identifying information of the called party matches the subscriber telephone number of the third tuple. If the identifying information of the called party matches the subscriber telephone number of the third tuple, then the CID server addresses the CID message to the video termination device IP address.

In yet another embodiment of the present invention, the video termination device comprises a CID client. The CID client receives the CID message and determines if the CID message is intended for the video termination device. If the CID message is intended for the video termination device, then the CID client provides the identifying information of the calling party to the video termination device for display on the video display device. If the CID message is not intended for the video termination device, then the CID client sends an error message to the CID server.

An embodiment of the present invention provides a method for providing caller ID service in a multi-region cable network. An invitation message is received from a soft switch, wherein the invitation message comprises identifying information of a calling party. The invitation message is forwarded to CID servers. At a CID server, a determination is made whether to process the invitation message. If the invitation message is processed, then a CID message is created comprising the identifying information of the calling party. The identifying information of the calling party is sent over a transmission path to a video termination device for display on a video display device.

In an embodiment of the present invention, the invitation message further comprises a user value. Forwarding the invitation message to CID servers is accomplished by determining the user value in the invitation message. The invitation message is forwarded to CID servers registered to the user value.

In an embodiment of the present invention, the invitation message further comprises identifying information of a called party. Determining at the CID server whether to process the invitation message is accomplished by receiving from a central datastore a first tuple comprising a subscriber telephone number and an assigned video termination device MAC address and receiving from a video termination device a second tuple comprising a read video termination device MAC address and a video termination device IP address. A determination is made whether the assigned video termination device MAC address matches the read video termination device MAC address. If the assigned video termination device MAC address matches the read video termination device MAC address, a third tuple is created comprising the subscriber telephone number and the video termination device IP address. A determination is made whether the identifying information of the called party matches the subscriber telephone number of the third tuple. In an embodiment of the present invention, the third tuple comprises the subscriber telephone number, the read video termination device MAC address, and the video termination device IP address. If the identifying information of the called party matches the subscriber telephone number of the third tuple, then the invitation request is processed.

In an embodiment of the present invention, the invitation message is forwarded by a SIP proxy server. If the called party is registered with the CID server, an "OK" response message is sent to the CID proxy service comprising an acknowledgement of the invitation message. The SIP proxy server sends a cancellation message to CID servers from which the "OK" response is not received.

The CID message is received at a CID client associated within the video termination device. A determination is made whether the CID message is intended for the video termination device. If the CID message is intended for the video termination device, then the identifying information of the calling party is provided to the video termination device for display on the video display device.

In an embodiment of the present invention, the CID message further comprises a destination IP address, and determining if the CID message is intended for the video termination device comprises determining if the destination IP address matches the IP address of the video termination device.

In an embodiment of the present invention, the CID message further comprises a MAC address of a destination video termination device and, determining if the CID message is intended for the video termination device comprises determining if the destination MAC address matches the MAC address of the video termination device.

In an embodiment of the present invention, the CID message further comprises a destination IP address and a MAC address of a destination video termination device, and determining if the CID message is intended for the video termination device comprises determining if the destination MAC address and destination IP address match the IP and MAC address of the video termination device.

In an embodiment of the present invention, if the CID message is not intended for the video termination device, an error message is sent from the video termination device to the CID server.

In an embodiment of the present invention, the transmission path comprises an in-band channel. In another embodiment of the present invention, the transmission path is an out-of-band channel. In still another embodiment of the present invention, the out-of-band channel is an RF channel. In yet another embodiment of the present invention, the out-of-band channel is a DOCSIS-compliant channel.

In an embodiment of the present invention, the video termination device comprises a set top box. In another embodiment of the present invention, the video termination device is integrated into a cable-ready video display device.

In an embodiment of the present invention, a system for providing caller ID service in a cable network comprises a cable network that conveys both data and video, a media terminal adapter (MTA) connected to the cable network, wherein the MTA comprises a subscriber telephone number associated with a subscriber, a soft switch, and a video termination device. The video termination device comprises a DOCSIS-compliant cable modem that receives IP-addressed messages via the cable network and CID client.

The MTA receives an incoming call from a soft switch and captures identifying information of the calling party. In embodiment of the present invention, the identifying information of the calling party comprises a caller telephone number. In another embodiment of the present invention, the identifying information of the calling party comprises a caller name. In still another embodiment of the present invention, the identifying information of the calling party identifies a call as originating from a facsimile machine.

The MTA creates a caller ID (CID) message comprising the identifying information of the calling party and sends the caller ID message to the IP address of the video termination device associated with the subscriber via the cable network. The CID client receives the CID message, determines if the CID message is intended for the video termination device, and if the CID message is intended for the video termination device, provides the identifying information of the calling party to the video termination device for display on a video display device. If the CID message is not intended for the video termination device, the CID client discards the CID message.

In an embodiment of the present invention, the video display device displays the identifying information of the calling party and video. In another embodiment of the present invention, the video display device displays the identifying information of the calling party.

In an embodiment of the present invention, the video termination device comprises a set top box. In another embodiment of the present invention, the video termination device is integrated into a cable-ready video display device.

In an embodiment of the present invention, the MTA receives a configuration file via the cable network upon bootup. The configuration file comprises a fully qualified domain name of the video termination device. The MTA directs the CID message to the video termination device using the fully qualified domain name of the video termination device. In yet another embodiment of the present invention, the configuration file comprises a list of the fully qualified domain names of video termination devices associated with the subscriber telephone number, and the MTA directs CID messages to the video termination devices using the fully qualified domain names of the video termination devices.

In an embodiment of the present invention, a system for providing caller ID service in a cable network comprises a cable network that conveys both data and video and a video termination device. The video termination device comprises a CID client, a DOCSIS-compliant cable modem and a media terminal adapter (MTA) comprising a subscriber telephone number associated with a subscriber. The MTA receives an incoming call from a soft switch, captures identifying information of the calling party, creates a caller ID (CID) message comprising the identifying information of the calling party, and sends the caller ID message to the CID client. The CID client receives the CID message, and provides the identifying information of the calling party to the video termination device for display on a video display device.

In an embodiment of the present invention, the identifying information of the calling party comprises a caller telephone number. In another embodiment of the present invention, the identifying information of the calling party comprises a caller name. In still another embodiment of the present invention, the identifying information of the calling party identifies a call as originating from a facsimile machine.

In an embodiment of the present invention, the video display device displays the identifying information of the calling party and video. In another embodiment of the present invention, the video display device displays the identifying information of the calling party.

In an embodiment of the present invention, the video termination device comprises a set top box. In another embodiment of the present invention, the video termination device is integrated into a cable-ready video display device.

DETAILED DESCRIPTION

The description of the present invention that follows utilizes a number of terms the definitions of which are provided below for the sake of clarity and comprehension:

CID—Caller identifying information.

DAVIC—Digital Audio-Video Council

DOCSIS—"Data Over Cable Service Interface Specification" issued by Cable Television Laboratories, Inc.

MRCN—Multi-region cable network. A cable network comprising multiple headends.

SIP—Session Initiation Protocol. SIP uses structured messages to initiate and complete transactions.

Soft switch—A soft switch integrates the Internet telephony and circuit-switched worlds. Typically, a soft switch duplicates Class 4 and 5 switch capabilities and operates in the classic public network environment where call control is separate from media flow.

UDP—User datagram protocol.

VTD—Video termination device. A VTD comprises a standalone video termination device and components that perform the function of a video termination device that are integrated into other devices, such as television sets, video monitors, and other devices.

In an embodiment of the present invention, caller identifying (CID) information of an incoming VoIP call is provided to a digital telephone subscriber within a multi-region cable network (MRCN). In this embodiment, the caller identifying information is provided to a video termination device (VTD) using a path that is different from the path by which the VoIP call packets are delivered to the digital telephone subscriber. In an embodiment of the present invention, a VTD comprises a standalone set top box (STB). However this is not meant as a limitation. For example, a VTD performing the communication functions of an STB may be incorporated into a cable-ready television with the security and access functions performed by an external PCMCIA type card. See, OpenCable™ Multistream CableCARD Interface Specification OC-SP-MC-IF-I02-040831.

Figure 1:
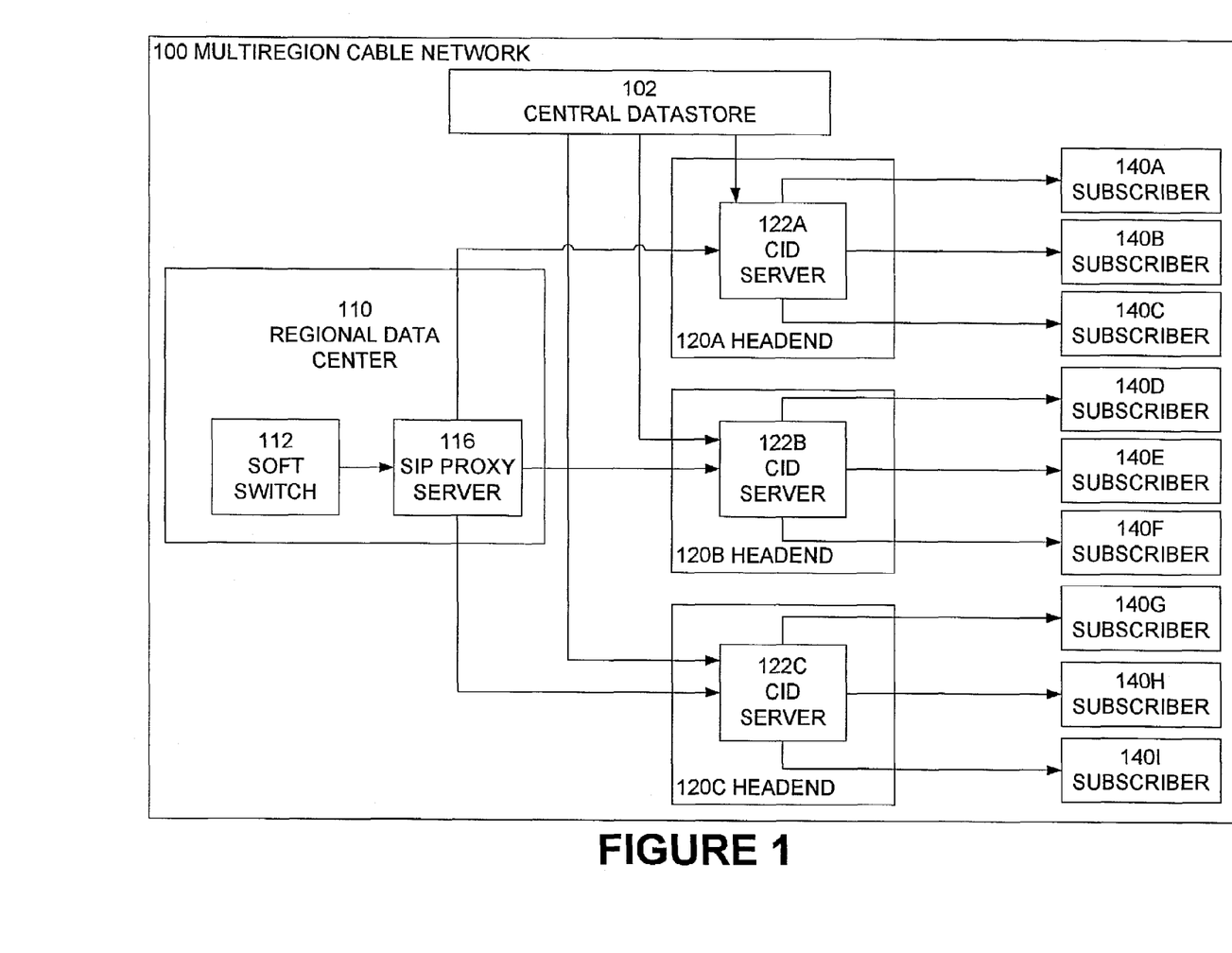
FIG. 1 illustrates a block diagram of high-level components used to provide caller ID service to a video termination device (VTD) in a multi-region cable network according to an embodiment of the present invention.

FIG. 1 illustrates a block diagram of high-level components used to provide CID information to a video termination device (VTD) in a multi-region cable network according to an embodiment of the present invention. Referring to FIG. 1, multi-region cable network (MRCN) 100 comprises a central datastore 102, a regional data center 110, headends 120A, 120B, and 120C, and subscribers 140A-I. A soft switch 112 and a proxy server 116 reside in the regional data center 110. Regional data center 110 provides data services to multiple headends 120A, 120B, and 120C. Each headend 120A-C comprises a CID server 122A-C. Each CID server 122A-C services a plurality of subscribers (subscribers 140A-I are illustrated). In an embodiment of the present invention, caller ID information is relayed from the soft switch 112 to CID servers 122A-C using SIP (Session Initiation Protocol). In an embodiment of the present invention, the CID servers 122A-C push CID information to the video termination devices via a QPSK modem (see FIG. 2) within the hub/node that serves the headend where a particular CID server resides. However, this is not meant as a limitation. As will be described below, other transmission paths may be used to convey the CID information to a VTD. In an embodiment of the present invention, CID information comprises the calling party's telephone number. In another embodiment of the present invention, the CID information further comprises an identifying label that is programmable by the subscriber. By way of illustration and not as a limitation, the subscriber may elect to display the caller's telephone number, the subscriber-defined label, or both. Additionally, a call may be identified as an incoming facsimile.

The proxy server 116 is interposed between these elements and is responsible for distributing the SIP INVITE messages generated by the soft switch 112 to the CID servers 122A-C that communicate with the VTDs (see FIG. 2) of subscribers 140A-I.

Central datastore 102 comprises information relating telephone number(s) of a digital telephone subscriber to the MAC address(es) of the VTDs assigned to that subscriber. As described below, information from central datastore 102 is used in conjunction with information provided by VTDs to CID servers 122A-122C to create an identifying tuple associating a subscriber telephone number with the IP address of a VTD.

Figure 2:
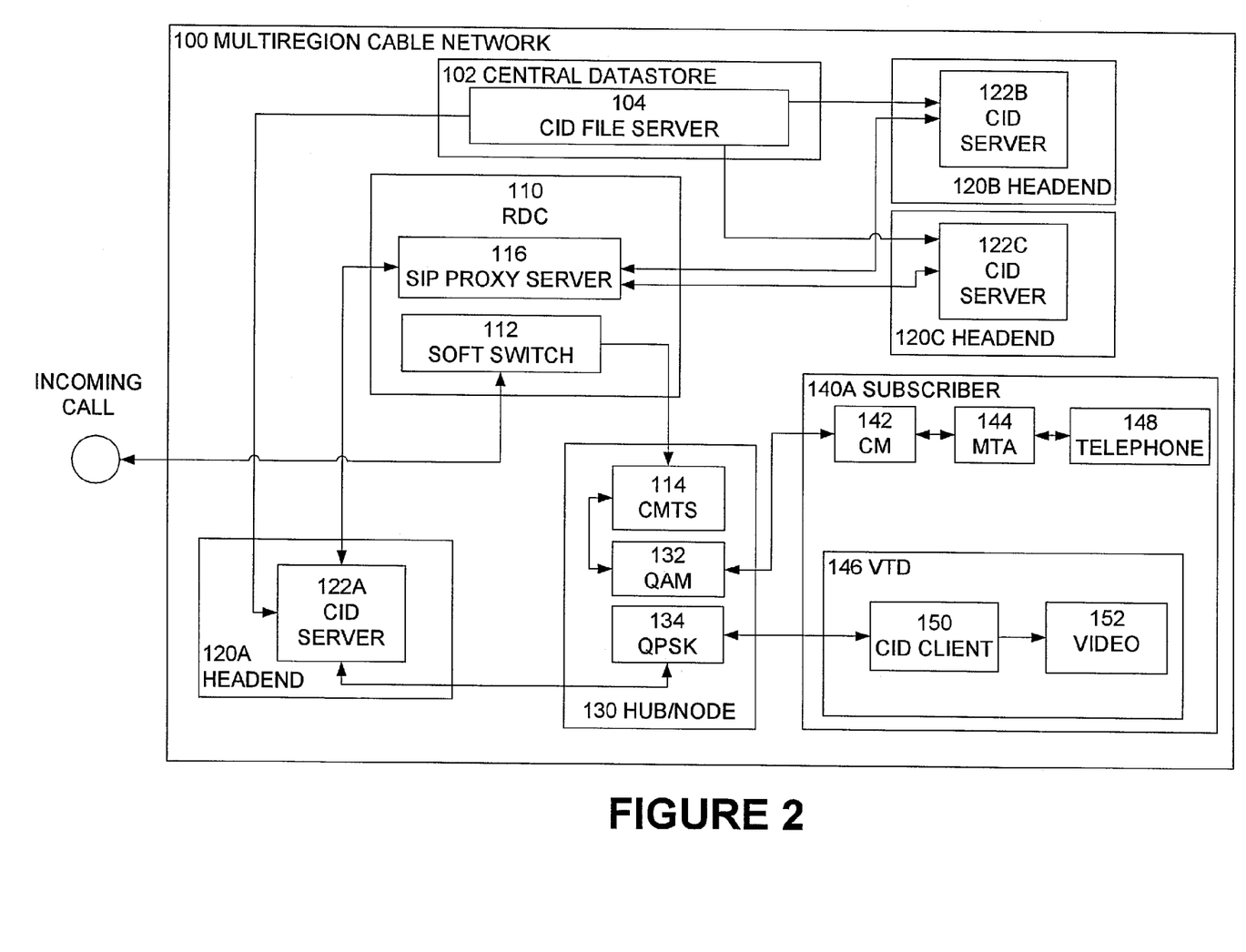
FIG. 2 further illustrates a block diagram of high-level components used to provide caller ID service to a video termination device (VTD) in a multi-region cable network according to an embodiment of the present invention.

FIG. 2 further illustrates a block diagram of high-level components used to provide caller ID service to a video termination device (VTD) in a multi-region cable network according to an embodiment of the present invention. Referring to FIG. 2, multi-region cable network 100 comprises a central datastore 102, a regional data center 110, headends 120A, 120B, and 120C, and hub/node 130. Regional data center 110 comprises soft switch 112 and SIP proxy server 116. Hub/node 130 comprises CMTS 114, QAM modem 132 and QPSK modem 134. CID server 122A is connected to hub/node 130, which is connected to subscriber 140A. Regional data center 110 services multiple headends 120A, 120B, and 120C. Central datastore 102 comprises information relating telephone number(s) of a digital telephone subscriber to the MAC address(es) of the VTDs assigned to that subscriber.

In an embodiment of the present invention, central datastore 102 generates a file of digital telephone subscribers and writes the file to a CID file server 104. In this embodiment, the file comprises a tuple binding a subscriber's phone number(s) and a set of assigned VTD MAC addresses. As described below, information from central datastore 102 is used in conjunction with information provided by VTDs to CID server 122A to create an identifying tuple associating a subscriber telephone number supported by CID server 122A with the IP address of a VTD.

Soft switch 112 receives incoming and outgoing calls for CMTS 114. SIP proxy server 116 serves to forward (bridge) SIP traffic from soft switch 112 to CID servers 122A-C within headends 120A-C. This bridging function allows soft switch 112 to serve additional headends for which the specific routing information is not known by soft switch 112. Soft switch 112 is adapted to fork SIP-INVITE message traffic to a plurality of SIP proxy servers. In an embodiment of the present invention, soft switch 112 is a Cisco BTS-series soft switch and SIP proxy server 116 is a Cisco CSPS-series proxy server. However, this is not meant as a limitation.

Headend 120A comprises CID server 122A, which performs the translation of SIP traffic into a UDP CID message. In an embodiment of the present invention, the format of the CID message is selected to efficiently use an out-of-band IP network to send the CID message to CID client 150. By way of illustration and not as a limitation, the CID message may be sent using the DAVIC protocol. However, this is not meant as a limitation. The CID message may be sent over an in-band channel/path without departing from the scope of the present invention.

Subscriber 140 comprises cable modem (CM) 142, MTA 144, video termination device (VTD) 146 and telephone 148. VTD 146 comprises a CID client 150 that is adapted to receive CID messages for display by the VTD 146 using the video processing system 152.

A telephone call follows a path from soft switch 112, to CMTS 114, to QAM modem 132, to cable modem 142, to MTA 144 to telephone 148. In an embodiment of the present invention, and as illustrated in FIG. 2, CID messages follow a separate path from the soft switch 112, to SIP proxy server 116, to QPSK modem 134 to CID client 150. However, this is not meant as a limitation. In an alternate embodiment of the present invention, a CID message may be sent to the VTD via an in-band video channel/path through QAM modulator 132. In yet another embodiment of the present invention, a CID message may be directed to CMTS 114. In this embodiment, CID client 150 is DOCSIS-compliant and receives the CID message via QAM modulator 132.

CID client 150 parses the information in the CID message and provides caller identifying information to the video processing system 152 of VTD 146 for display on the subscriber's television set. In an embodiment of the present invention, caller identifying information comprises the caller's telephone number. In another embodiment of the present invention, the CID client 150 associates the caller's telephone number with a subscriber-defined label. In this embodiment, caller identifying information that is displayed is programmable by the subscriber. By way of illustration and not as a limitation, the subscriber may elect to display the caller's telephone number, the subscriber-defined label, or both.

As previously stated, CID server 122A within headend 120A obtains a list of digital telephone subscribers that receive video services via the MRCN from CID file server 104. The digital telephone subscriber list correlates a subscriber's telephone number(s) and a set of VTD MAC addresses assigned to that subscriber. VTD 146 comprises a CID client 150 that registers with CID server 122A by providing the CID server 122A a "read" MAC address and an IP address of the VTD. The CID server 122A matches an "assigned" VTD MAC address to the "read" VTD MAC address, then creates a tuple associating the subscriber telephone number(s), read MAC address, and IP address of the VTD 146. The CID server uses the VTD MAC address(es) to form a tuple that associates the subscriber telephone number(s) obtained from the CID file server 104 with the "read" MAC address and IP addresses of the VTD's managed by that CID server received from the CID client 150 during registration. The tuple created by CID server 122A is compared to a called number within an INVITE message received by CID server 122A from SIP proxy server 116. If the called number in the INVITE message matches the telephone number in a tuple created by CID server 122A, CID server 122A creates and sends a CID message using the IP address of the VTD associated with that telephone number.

Figure 3:
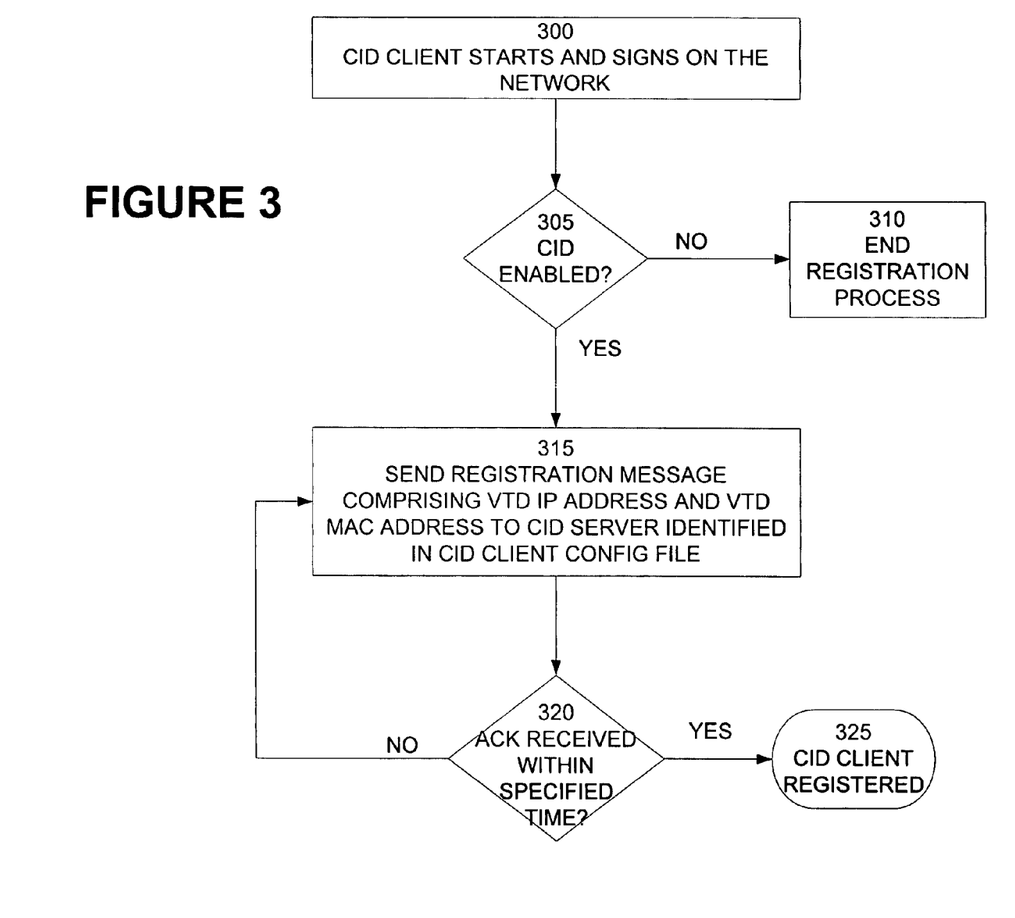
FIG. 3 illustrates a process by which a CID client registers with a CID server according to an embodiment of the present invention.

FIG. 3 illustrates a process by which a CID client registers with a CID server according to an embodiment of the present invention. A CID client starts and signs on to the cable network 300. The CID client receives an IP address from the cable network. A determination is made whether the caller ID service is enabled 305. If caller ID service is not enabled, the registration process ends 310. If caller ID service is enabled, the CID client sends a registration message comprising the IP address and the MAC address of the VTD associated with the CID client. In an embodiment of the present invention, the registration message is in UDP format. However, this is not meant as a limitation. As will be appreciated by those skilled in the art, other message protocols may be used without departing from the scope of the present invention.

The CID server maps the IP address of the VTD to the called number. The CID message is addressed to the VTD IP address. In an embodiment of the present invention, the CID message further comprises the MAC address of the VTD. The VTD MAC and/or the VTD IP address is used by the CID client to confirm that the CID message is directed to the correct VTD.

A determination is made whether the CID client has received an acknowledgement from the CID server within a fixed period of time 320. If the acknowledgement is received, the CID client is deemed registered with the CID server 325. If the acknowledgement is not received within the time specified, the CID client again sends a registration message as previously described 315.

In an embodiment of the present invention, a "Global Register Request" message is broadcast on a specific subnet to request CID clients to re-register with the CID server identified in the CID client configuration file. In yet another embodiment of the present invention, to prevent sign-on "storms," a CID client uses MAC address of the VTD on which it resides to delay sending its registration message. By way of illustration and not as a limitation, a CID client uses the fifth byte of the VTD MAC address as the number of seconds and three times the sixth byte as the number of milliseconds that the CID client would wait before sending a registration message. For example, a CID client residing on a VTD with a MAC address of 01 02 03 04 05 06 would wait 5 sec 18 ms (5018 ms) before sending its CID registration message.

Referring again to FIGS. 1 and 2, the soft switch 112 comprises a feature set specifically for providing caller ID service to VTDs. When a called subscriber 140 has the feature enabled, the soft switch 112 generates a SIP INVITE message and sends the message to a SIP proxy server. In an embodiment of the present invention, the SIP INVITE message sent by the soft switch 112 comprises a feature control protocol (FCP) message body. However, this is not meant as a limitation. Other protocols may be used to convey the CID information in the SIP message body.

Each proxy server has static registrations provisioned for each CID server that it services. When the proxy receives the INVITE message from the soft switch 112, it relays the INVITE message to the CID servers within the headends 120A-C served by the regional data center 110 in which the soft switch 112 resides. In UNIX terminology, the proxy "forks" the INVITE message request across all CID servers 122A-C.

Each CID server that receives the INVITE message determines whether the subscriber associated with the called number is registered with that CID server as previously described. A CID server that actually manages the subscriber that belongs to the called number responds with a "200 OK" message. On reception of the 200 OK message, the proxy server issues a CANCEL message to cancel any other forked requests that went to other CID servers and relays the 200 OK message back to the soft switch 112. The soft switch 112 sends an "ACK" message acknowledging the 200 OK followed by a "BYE" message terminating the session.

The soft switch 112 generates two additional types of INVITE messages. The first is the INVITE message generated on a periodic basis as a "keep-alive" message between the soft switch 112 and the SIP proxy server 116. The keep-alive allows the soft switch 112 to insure that the SIP proxy server 116 is accessible and that the SIP application is active. As explained below, the SIP proxy server 116 responds to a keep-alive message with a "404" NOT FOUND RESPONSE CODE. The soft switch 112 interprets the "404" response as an indication that the feature server is accessible and active. A second type of INVITE message is generated when the soft switch 112 is restarted for any reason. Like the keep-alive INVITE message, SIP proxy server 116 responds to this INVITE message with a "404" NOT FOUND RESPONSE.

The three types of INVITE messages are differentiated by the SIP proxy server 116 using the "Request URI" in the INVITE message. For the INVITE message destined for a CID server, the Request URI user field comprises a "user value." As illustrated in the message structures describe below, the user value in user field the value "fs.". However, this is not meant as a limitation. The SIP proxy server responds to this user value by forwarding (forking) the INVITE message in a parallel manner to all the CID servers registered to that "user". The other two INVITE messages have different RequestURI user values. A SIP proxy server is not be populated with any routing rules for these "users" resulting in the "404" responses being generated by the SIP proxy server and returned to the soft switch 112.

In an embodiment of the present invention, the message body for the INVITE message uses FCP. The FCP body comprises a called party phone number (CalledPN), a calling party phone number (CallingPN), and SubName, SubId and Privacy parameters. The CalledPN indicates the subscriber to whom the call is destined. The CallingPN is the calling party number while the SubName and SubId fields comprise other calling party identifying information. The Privacy parameter indicates whether and how the CID information is restricted for this number as follows:

Off—No Privacy is requested; both CallingPN and other calling party identifying information may be displayed on the client VTD.

Name—The CallingPN is replaced with the string "Private" when passed to the client. Other calling party identifying information may be displayed.

Full—The calling party identifying information is replaced with the string "Private" when passed to the VTD client.

Figure 4:
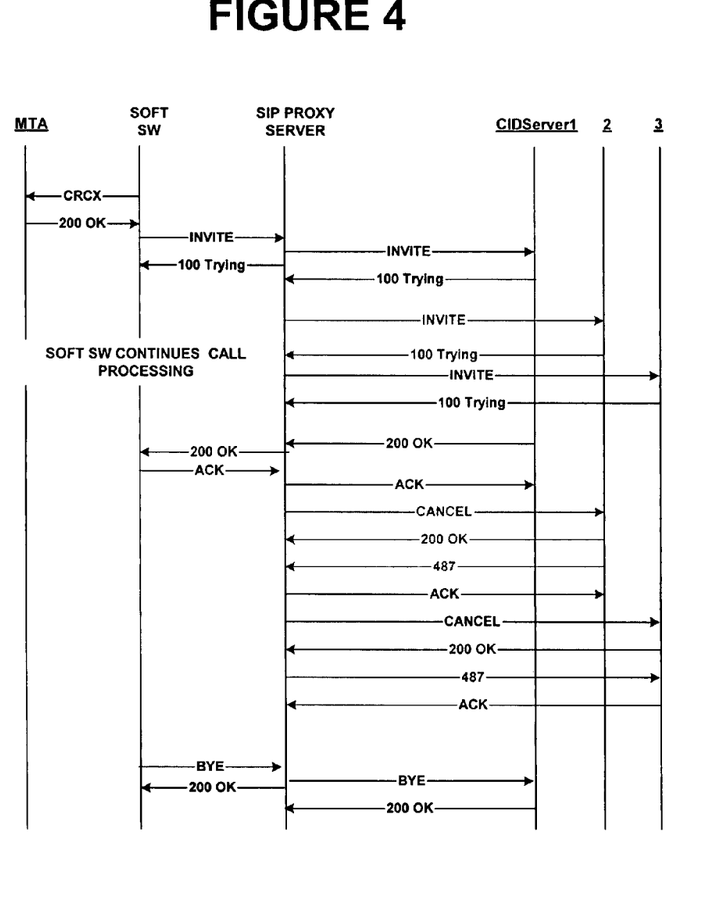
FIG. 4 illustrates a message flow within a caller ID-enabled cable network according to embodiments of the present invention.

FIG. 4 illustrates a message flow within a caller ID-enabled cable network according to embodiments of the present invention. Referring to FIG. 2 and FIG. 4, the soft switch 112 invokes a new message sequence for each call it receives that is intended for a subscriber on the cable network. The soft switch 112 generates an INVITE message with an FCP message body that is directed through a SIP proxy server 116 to one or more CID servers configured specifically for the caller ID service. The soft switch 112 then continues with normal call processing. This insures that if for some reason a problem occurs with the processing for the INVITE message by the proxy or CID server(s) that the call processing is not interrupted.

FIG. 4 illustrates an exemplary embodiment in which the SIP proxy server forks the INVITE message to three different CID servers (1, 2 and 3). Each CID server parses the FCP INVITE message body to determine whether the CalledPN value represents a subscriber telephone number for which the particular CID server is responsible. As illustrated in FIG. 4, CID server 1 recognizes that it is responsible for the user identified by the CalledPN. CID server 1 responds to the INVITE message with a "200" OK message. The SIP proxy server then cancels the other call legs to CID servers 2 and 3 and forwards the answer from CID server 1 back to the soft switch 112.

The SIP message structures for each of the exchanges are illustrated in the tables that follow below. A SIP INVITE message is sent from the soft switch to the SIP proxy server:

```
INVITE sip:fs@190.101.100.85:22311 SIP/2.0
Via: SIP/2.0/UDP sia=IAD01CA101.voip.hrndva.rr.com:5060
From: <sip:ca_312@ sia=IAD01CA101.voip.hrndva.rr.com:5060>;tag=1_146_f4653_8xy3
To: <sip:feature_fs@190.101.100.85:22311>
Call-ID: ytknhrccemamfbmtzjmiwilgz@ sia=IAD01CA101.voip.hrndva.rr.com
CSeq: 1 INVITE
Max-Forwards: 70
Contact: <sip:ca_312@ sia=IAD01CA101.voip.hrndva.rr.com:5060>
Content-Length: 342
Content-Type: application/fcp
Operation=Notify 0.0
Oid=1
CalledPN=9722234010 SubId="jpcampbell", NatureOfNumber=National, NatureOfDial=Local
CallingPN=9722234001 LataId=972, PopId=1, SubName="Bob", OLIDigit=00, SubId="jpdivirgilio",
Privacy=Off
Leg-Addr=2 CS=1 CSA=3710 BCSM-State=Present_Call NumCalls=1
DP=Call_Accepted DPMODE=Continue Trigger=Call_Accepted_Notify Subscriber Static
```

The proxy server reads the SIP INVITE message header, maps the SIP URI to statically defined CID servers (three are illustrated) and forward (forks) the INVITE message to them. Only the forwarded message to caller ID server 1 is presented below:

```
INVITE sip:fs@190.101.100.86:22311 SIP/2.0
Via: SIP/2.0/UDP 190.101.100.85:22311;branch=218dea8-da6963b2-26201df5-1
Via: SIP/2.0/UDP sia= IAD01CA101.voip.hrndva.rr.com:5060
Record-Route: <sip:700139@128.107.171.85:5060>
From: <sip:ca_312@sia=IAD01CA101.voip.hrndva.rr.com:5060>;tag=1_146_f4653_8xy3
To: <sip:feature_fs@190.101.100.85:22311>
Call-ID: ytknhrccemamfbmtzjmiwilgz@ sia=IAD01CA101.voip.hrndva.rr.com:5060
CSeq: 1 INVITE
Max-Forwards: 70
Contact: <sip:ca_312@ siaIAD01CA101.voip.hrndva.rr.com:5060>
Content-Length:  342
Content-Type: application/fcp
Operation=Notify 0.0
Oid=1
CalledPN=9722234010 SubId="jpcampbell", NatureOfNumber=National,
NatureOfDial=Local
CallingPN=9722234001 LataId=972, PopId=1, SubName="Bob", OLIDigit=00, SubId="
jpdivirgilio", Privacy=Off
Leg-Addr=2 CS=1 CSA=3710 BCSM-State=Present_Call NumCalls=1
DP=Call_Accepted DPMODE=Continue Trigger=Call_Accepted_Notify Subscriber Static
```

CID servers 1, 2, and 3 read the CalledPN field value in the FCP message body. CID server 1 recognizes that this INVITE message is for a subscriber it controls. CID server 1 creates a CID message and directs it to the proper CID client 150 via the QPSK channel (or path). Additionally, CID server 1 sends a "200" OK message to SIP proxy server 116 to indicate that it is the controlling CID server for this INVITE message. Only CID server 1 returns a 200 OK:

```
SIP/2.0 200 OK
Via: SIP/2.0/UDP 190.101.100.85:22311;branch=218dea8-da6963b2-26201df5-1
Via: SIP/2.0/UDP sia=IAD01CA101.voip.hrndva.rr.com:5060
Record-Route: <sip:700139@128.107.171.85:5060>
From:
<sip:ca_312@sia=IAD01CA101.voip.hrndva.rr.com:5060>;tag=1_146_f4653_8xy3
To: <sip:feature_fs@190.101.100.85:22311>;tag=343_25geg_2323
Call-ID: ytknhrccemamfbmtzjmiwilgz@sia=IAD01CA101.voip.hrndva.rr.com:5060
CSeq: 1 INVITE
Contact: <sip:cidServer@190.101.100.86:5060>
Max-Forwards: 70
Content-Length: 0
```

SIP proxy server 116 sends a CANCEL message to cancel the other call legs to the CID servers 2 and 3 that the INVITE message was forked to. The cancellation message for CID server 2 is as follows:

```
CANCEL sip:fs@190.101.100.86:22311 SIP/2.0
Via: SIP/2.0/UDP 190.101.100.213:10211;branch=218dea8-da6963b2-26201df5-2
From: <sip:ca__312@sia=IAD01CA101.voip.hrndva.rr.com:5060>;tag=1__146__f4653__8xy3
To: <sip:feature__fs2@190.101.100.86:22311>
Call-ID: ytknhrccemamfbmtzjmiwilgz@sia=IAD01CA101.voip.hrndva.rr.com:5060
CSeq: 101 CANCEL
Content-Length: 0
```

The CANCEL message is acknowledged by CID server 2 with a "200 OK" message and the original INVITE message is acknowledged by CID server 2 with a "487" REQUEST TERMINATED message, which in turn is acknowledged with an ACK message by the SIP proxy server 116:

```
SIP/2.0 200 OK
Via: SIP/2.0/UDP 190.101.100.213:10211;branch=218dea8-da6963b2-26201df5-2
From: <sip:ca__312@sia=IAD01CA101.voip.hrndva.rr.com:5060>;tag=1__146__f4653__8xy3
To: <sip:feature__fs2@190.101.100.86:22311>
Call-ID: ytknhrccemamfbmtzjmiwilgz@sia=IAD01CA101.voip.hrndva.rr.com:5060
CSeq: 1 CANCEL
Contact: <sip:fs@sia=IAD01CA101.voip.hrndva.rr.com:5060>
Max-Forwards: 70
Content-Length: 0
```

```
SLP/2.0 487 Request Cancelled
Via: SIP/2.0/UDP 190.101.100.213:10211;branch=218dea8-da6963b2-26201df5-2
From: <sip:ca__312@sia=IAD01CA101.voip.hrndva.rr.com:5060>;tag=1__146__f4653__8xy3
To: <sip:feature__fs2@190.101.100.86:22311>
Call-ID: ytknhrccemamfbmtzjmiwilgz@sia=IAD01CA101.voip.hrndva.rr.com:5060
CSeq: 101 INVITE
Content-Length: 0
```

```
ACK sip:fs2@190.101.100.87:22311 SIP/2.0
Via: SIP/2.0/UDP 190.101.100.85:22311;branch=218dea8-da6963b2-26201df5-2
From: <sip:ca__312@sia=IAD01CA101.voip.hrndva.rr.com:5060>;tag=1__146__f4653__8xy3
To: <sip:feature__fs2@190.101.100.86:22311>
Call-ID: ytknhrccemamfbmtzjmiwilgz@sia=IAD01CA101.voip.hrndva.rr.com:5060
CSeq: 101 ACK
Content-Length: 0
```

SIP proxy server 116 forwards the 200 OK from CID server 1 to the soft switch 112. Soft switch 112 responds to the SIP proxy server 116 with an ACK message, which is forwarded to CID server 1 (forwarded message not shown):

```
SIP/2.0 200 OK
Via: SIP/2.0/UDP sia=IAD01CA101.voip.hrndva.rr.com:5060
Record-Route: <sip:700139@128.107.171.85:5060>
From: <sip:ca__312@sia=IAD01CA101.voip.hrndva.rr.com:5060>;tagx1__146__f4653__8xy3
To: <sip:feature__fs@190.101.100.85:22311>;tag=343__25geg__2323
Call-ID: ytknhrccemamfbmtzjmiwilgz@sia=IAD01CA101.voip.hrndva.rr.com:5060
CSeq: 1 INVITE
```

-continued

```
Contact: <sip:cidServer@190.101.100.86:5060>
Max-Forwards: 70
Content-Length: 0
```

---

```
ACK sip:fs@190.101.100.85:22311 SIP/2.0
Via: SIP/2.0/UDP sia=IAD01CA101.voip.hrndva.rr.com:5060
From: <sip:ca_312@sia=IAD01CA101.voip.hrndva.rr.com:5060>;tag=1_146_f4653_8xy3
Route: <sip:cidServer@190.101.100.86:5060>
To: <sip:feature_fs@190.101.100.85:22311>>;tag=343_25geg_2323
Call-ID: ytknhrccemamfbmtzjmiwilgz@sia=IAD01CA101.voip.hrndva.rr.com:5060
CSeq: 1 ACK
Max-Forwards: 70
Content-Length: 0
```

The soft switch 112 sends a BYE message to SIP proxy server 112 that is acknowledged with a "200" OK message. The SIP proxy server 112 then sends a BYE message to CID server 1 that is also acknowledged with a "200" OK message. These messages are not illustrated but are known to those of ordinary skill in the art.

As previously described, CID server 1 recognizes that it is responsible for the VTD associated with the telephone number represented in the CalledPN field of the INVITE message. Accordingly, CID server 1 creates a CID message and sends it to the CID client associated with the VTD. This association was established during the registration of the CID client with the CID server. In an embodiment of the present invention, the CID message uses UPD and comprises the following structure:

| | | |
|---|---|---|
| CIDMessageType | (1 byte) ubmsbf 0 × 5A (90) | |
| MACAddress | (6 bytes) ubmsbf | |
| CallerNameLength | (1 byte) ubmsbf | |
| CallerName | (CallerNameLength bytes) ASCII | |
| CallerPhoneLength | (1 byte) ubmsbf | Variable size. |
| CallerPhone | (CallerPhoneLength bytes) ASCII | |
| CalledPhoneLength | (1 byte) ubmsbf | |
| CalledPhone | (CalledPhoneLength bytes) ASCII | |
| DisplaySeconds | (1 byte) ubmsbf | |

CallerNameLength, CallerPhoneLength, and CalledPhoneLength contain the null-terminated byte.

A subscriber may register multiple VTDs and associate each VTD with the same or a different telephone number. The CID message is sent to the IP address of the VTD associated with the called telephone number.

In an embodiment of the present invention, the MAC address of the VTD is also carried in the CID message. The CID client compares the MAC address in the CID message to the MAC address of the VTD in which the CID client resides. If the MAC addresses do not match, then the CID client performs the following:

The CID client does not display the CID on the viewer's screen.

The CID client sends a "Wrong MAC" message to the CID server advising the CID server of the incorrect mapping.

The CID client sends a Register message to associate its IP address with the MAC address of the VTD in which the CID client resides.

In an embodiment of the present invention, the CID server 122 adheres to the standard Mystro Application Component (MAS) design architecture. This architecture provides conductor interactions, database connectivity, and CORBA messaging for relatively little development cost. This architecture further allows the CID server 122 to reside on its own hardware, allowing the CID server 122 to be scaled independently of other network components.

In an exemplary embodiment of the present invention, the CID server 122 is a Java application run on a Linux platform, using JacORB as its communication protocol. The MAS database is Oracle 9i. The CID server hardware is a Sun V65 with dual 2.4 GHz Intel Pentium processors with 2 GB of RAM. As will be appreciated by those skilled in the art, other languages, platforms, databases, and hardware may be used to implement embodiments of the present invention without departing from its scope.

In yet another embodiment of the present invention, the security is provided using IPSEC, or IP-level Security. This means that that traffic is physically secure between the routers and is transparent to CID server 122 A, B or C. Transfers of files from CID file server 104 require the standard user/password authentication. In an alternate embodiment of the present invention, SecureCopy is used to encrypt file data retrieved from the CID file server prior to transport.

Figure 5:
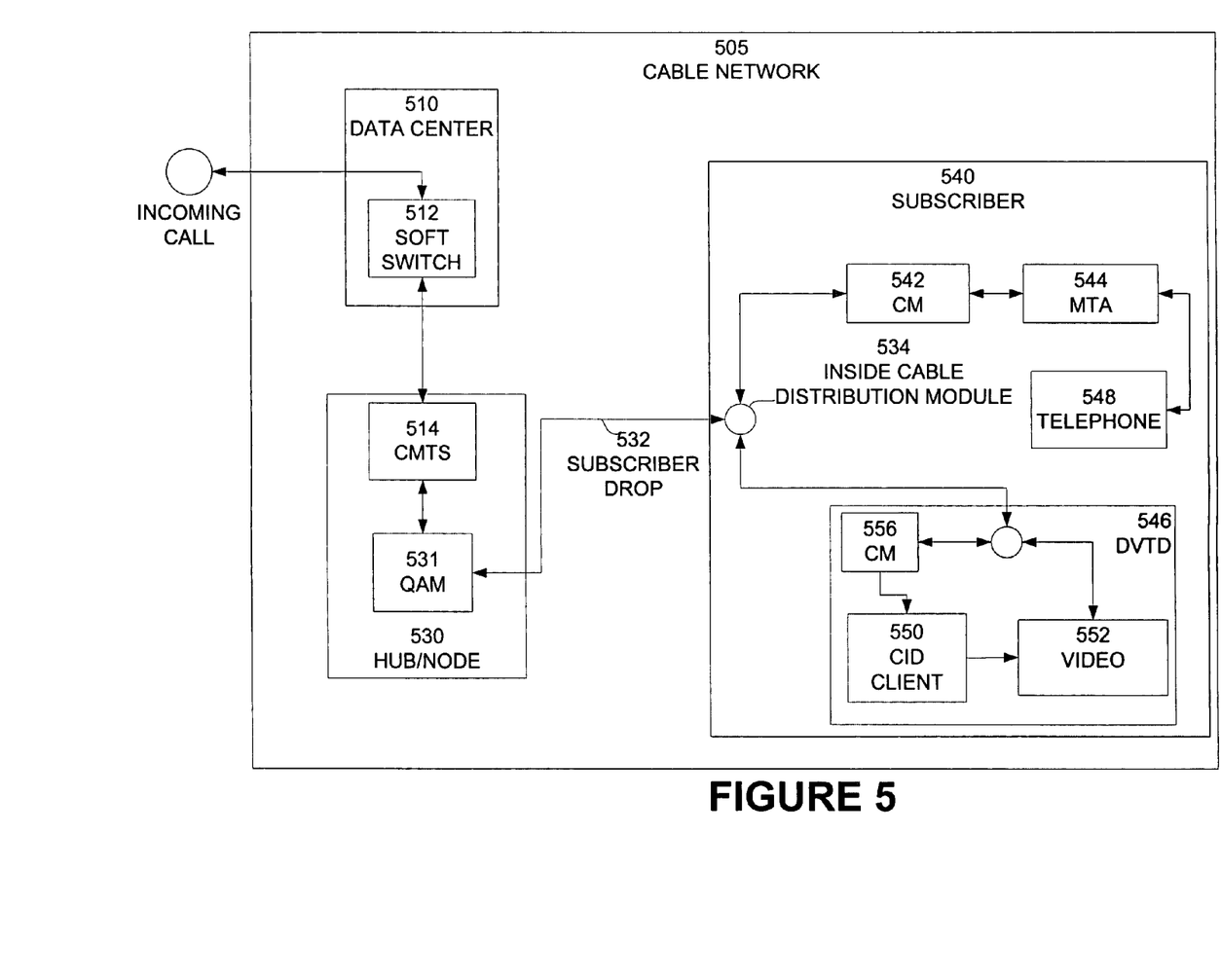
FIG. 5 illustrates a block diagram of high-level components used to convey CID information to a DOCSIS-compliant video termination device (DVTD) in a cable network according to an embodiment of the present invention.

FIG. 5 illustrates a block diagram of high-level components used to convey CID information to a DOCSIS-compliant video termination device (DVTD) in a cable network according to an embodiment of the present invention. Referring to FIG. 5, cable network 505 comprises a data center 510, hub/node 530, and subscriber 540. Data center 510 comprises soft switch 512. Hub/node 530 comprises a CMTS 514 and QAM modem 531. Soft switch 512 receives incoming and outgoing calls for CMTS 514.

Subscriber 540 is connected to hub/node 530 via subscriber drop 532. Inside cable distribution module 534 provides a path to cable modem (CM) 542 and video terminal device (DVTD) 546. CM 542 is connected to telephone 548 via MTA 544. DVTD 546 comprises a cable modem 556, a CID client 550, and a video processing system 552. CID client 550 is adapted to receive messages from MTA 544 addressed to CM 556.

A telephone call follows a path from soft switch 512, to CMTS 514, to QAM modem 531, to cable modem 542, to MTA 544 to telephone 548. In an embodiment of the present invention, MTA 544 provides CID client 550 CID information of an incoming call directed to MTA 544 by addressing a CID message to cable modem 556. In an embodiment of the present invention, CID information comprises the calling party's telephone number. In another embodiment of the present invention, the CID information further comprises an identifying label that is programmable by the subscriber. By way of illustration and not as a limitation, the subscriber may elect to display the caller's telephone number, the subscriber-defined label, or both.

In an embodiment of the present invention, when MTA 544 boots, it receives its MTA configuration file comprising a fully qualified domain name (FQDN) for the DVTD of the subscriber to whom the MTA is assigned. When the MTA 544 detects an incoming call, MTA 544 sends an IP-based message to the DVTD 546 (via the CMTS 514) that comprises the CID information. The CID information is provided to video processing system 552 of DVTD 546 for display on a display device (not illustrated).

Figure 6:
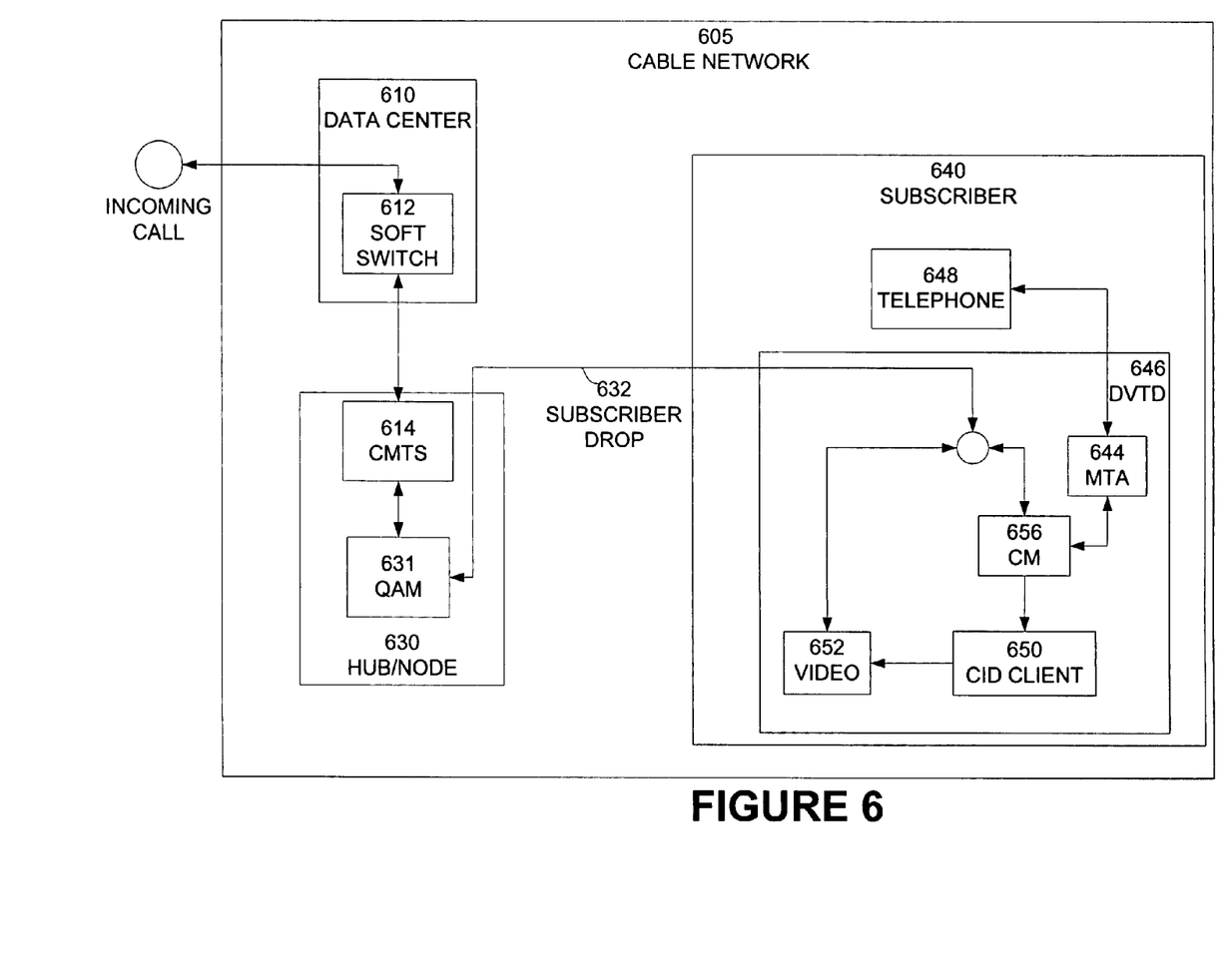
FIG. 6 illustrates a block diagram of high-level components used to convey CID information to a DOCSIS-compliant video termination device (DVTD) comprising an MTA and a cable modem in a cable network according to an embodiment of the present invention.

FIG. 6 illustrates a block diagram of high-level components used to convey CID information to a DOCSIS-compliant video termination device (DVTD) comprising an MTA and a cable modem in a cable network according to an embodiment of the present invention. Referring to FIG. 6, cable network 605 comprises a data center 610, hub/node 630, and subscriber 640. Data center 610 comprises soft switch 612. Hub/node 630 comprises a CMTS 614 and QAM modem 631. Soft switch 612 receives incoming and outgoing calls for CMTS 614.

Subscriber 640 is connected to hub/node 630 via subscriber drop 632. In this embodiment of the present invention, the subscriber drop 632 terminates at video terminal device (DVTD) 646. DVTD 646 comprises a cable modem 656, and MTA 644, a CID client 650, and a video processing system 652. CID client 650 is adapted to receive messages from MTA 644 addressed to CM 656. Video and data (including voice and caller ID information) is conveyed to DVTD 646 over a single network connection.

A telephone call follows a path from soft switch 612, to CMTS 614, to QAM modem 631, to cable modem 656, to MTA 644 to telephone 648. In an embodiment of the present invention, MTA 644 provides CID client 650 CID information of an incoming call directed to MTA 644 by addressing a CID message to cable modem 656. In an embodiment of the present invention, CID information comprises the calling party's telephone number. In another embodiment of the present invention, the CID information further comprises an identifying label that is programmable by the subscriber. By way of illustration and not as a limitation, the subscriber may elect to display the caller's telephone number, the subscriber-defined label, or both.

A system and method for providing caller ID service in a multi-region VoIP HFC video infrastructure has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular.

What is claimed is:

1. A system for providing caller ID service in a multi-region cable network comprising:
a headend adapted to provide video services to subscribers, wherein the headend comprises a caller ID (CID) server;
a regional data center comprising a soft switch and a SIP proxy server, wherein the regional data center is adapted to provide digital services to the subscribers of the headend and the SIP proxy server is adapted to:
receive an invitation message from the soft switch, wherein the invitation message comprises identifying information of a calling party and identifying information of a called party; and
forward the invitation message to a CID server;
the CID server adapted to:
parse the invitation message to obtain the identifying information of the calling party and the identifying information of the called party; create a CID message comprising the identifying information of the calling party; and
send the identifying information of the calling party over a transmission path to a video termination device of the called party for display on a video display device, and
wherein the video termination device comprises a CID client adapted to:
receive the CID message;
determine if the CID message is intended for the video termination device; if the CID message is intended for the video termination device, then provide the identifying information of the calling party to the video termination device for display on the video display device; and
if the CID message is not intended for the video termination device, then send an error message to the CID server.

2. The system of claim 1, wherein identifying information of the calling party comprises a caller telephone number.

3. The system of claim 1, wherein identifying information of the calling party comprises a caller name.

4. The system of claim 1, wherein identifying information of the calling party identifies a call as originating from a facsimile machine.

5. The system of claim 1, wherein the identifying information of the called party comprises a called telephone number.

6. The system of claim 1, wherein the multi-region cable network further comprises a central datastore comprising a first tuple comprising a subscriber telephone number and an assigned video termination device MAC address and wherein the CID server is further adapted to:
receive from the central datastore the first tuple;
receive from the video termination device a second tuple comprising a read video termination device MAC address and a video termination device IP address;
determine whether the assigned video termination device MAC address matches the read video termination device MAC address;
if the assigned video termination device MAC address matches the read video termination device MAC address, then create a third tuple comprising the subscriber telephone number and the video termination device IP address;
determine whether the identifying information of the called party matches the subscriber telephone number of the third tuple;
if the identifying information of the called party matches the subscriber telephone number of the third tuple, then address the CID message to the video termination device IP address.

7. The system of claim 6, wherein the third tuple further comprises the read video termination device MAC address.

8. The system of claim 1, wherein the transmission path conveys both video and data and the video display device is adapted to display the identifying information of the calling party and video.

9. The system of claim 1, wherein the video display device is adapted to display the identifying information of the calling party.

10. The system of claim 1, wherein the video termination device comprises a set top box.

11. The system of claim 1, wherein the video termination device is integrated into a cable-ready video display device.

12. The system of claim 1 wherein the transmission path is an in-band channel.

13. The system of claim 1, wherein the transmission path is an out-of-band channel.

14. The system of claim 13, wherein the out-of-band channel is an RF channel.

15. The system of claim 13, wherein the out-of-band channel is a DOCSIS-compliant channel.

16. The system of claim 1, wherein the invitation message uses the session initiation protocol.

17. A system for providing caller ID service in a multi-region cable network comprising:
a central datastore comprising a first tuple comprising a subscriber telephone number and an assigned video termination device MAC address;
a headend adapted to provide video services to subscribers;
a regional data center comprising a soft switch and a caller ID (CID) proxy server,
wherein the regional data center is adapted to provide digital services to the subscribers of the headend and the SIP proxy server is adapted to:
  receive an invitation message from a soft switch, wherein the invitation message comprises identifying information of a calling party, identifying information of a called party, and a user value;
  forward the invitation message to CID servers registered to the user value;
  receive an "OK" response from a CID server with which the called party has registered; and
  send a cancellation message to CID servers from which the "OK" response is not received; and
the CID server adapted to:
  parse the invitation message;
  receive from the central datastore the first tuple;
  receive from the video termination device a second tuple comprising a read video termination device MAC address and a video termination device IP address;
  determine whether the assigned video termination device MAC address matches the read video termination device MAC address;
  if the assigned video termination device MAC address matches the read video termination device MAC address, then create a third tuple comprising the subscriber telephone number and the video termination device IP address;
  determine whether the identifying information of the called party matches the subscriber telephone number of the third tuple;
  if the identifying information of the called party matches the subscriber telephone number of the third tuple, then:
    send the SIP proxy server the "OK" response message comprising an acknowledgement of the invitation message;
    obtain the identifying information of the calling party from the invitation message;
    create a CID message comprising the identifying information of the calling party; and
    send the identifying information of the calling party over a transmission path to the IP address of the video termination device for display on a video display device.

18. The system of claim 17, wherein identifying information of the calling party comprises a caller telephone number.

19. The system of claim 17, wherein the identifying information of the calling party comprises a caller name.

20. The system of claim 17, wherein identifying information of the calling party identifies a call as originating from a facsimile machine.

21. The system of claim 17, wherein the identifying information of the called party comprises a called telephone number.

22. The system of claim 17, wherein the third tuple further comprises the read video termination device MAC address.

23. The system of claim 17, wherein the video termination device comprises a CID client adapted to:
receive the CID message;
determine if the CID message is intended for the video termination device; and
if the CID message is intended for the video termination device, then provide the identifying information of the calling party to the video termination device for display on the video display device.

24. The system of claim 23, wherein the CID client is further adapted to:
if the CID message is not intended for the video termination device, then send an error message to the CID server.

25. The system of claim 17, wherein the transmission path conveys both video and data and the video display device is adapted to display the identifying information of the calling party and video.

26. The system of claim 17, wherein the video display device is adapted to display the identifying information of the calling party.

27. The system of claim 17, wherein the video termination device comprises a set top box.

28. The system of claim 17, wherein the video termination device comprises a cable-ready video display device.

29. The system of claim 17 wherein the transmission path is an in-band channel.

30. The system of claim 17, wherein the transmission path is an out-of-band channel.

31. The system of claim 30, wherein the out-of-band channel is an RF channel.

32. The system of claim 30, wherein the out-of-band channel is a DOCSIS-compliant channel.

33. The system of claim 17, wherein the invitation message and the "OK" response message use the session initiation protocol.

34. A method for providing caller ID service in a multi-region cable network comprising:
receiving an invitation message from a soft switch, wherein the invitation message comprises identifying information of a calling party;
forwarding the invitation message to CID servers;
determining at a CID server whether to process the invitation message;
if the invitation message is processed, then:
  creating a CID message comprising the identifying information of the calling party;
  sending the identifying information of the calling party over a transmission path to a video termination device for display on a video display device;

receiving the CID message at a CID client associated within the video termination device;

determining if the CID message is intended for the video termination device;

if the CID message is intended for the video termination device, then providing the identifying information of the calling party to the video termination device for display on the video display device; and if the CID message is not intended for the video termination device, then sending an error message to the CID server.

35. The method for providing caller ID in a multi-region cable network of claim 34, wherein the invitation message further comprises a user value and wherein forwarding the invitation message to CID servers comprises:

determining the user value in the invitation message; and forwarding the invitation message to CID servers registered to the user value.

36. The method for providing caller ID in a multi-region cable network of claim 34, wherein the invitation message further comprises identifying information of a called party and wherein determining at the CID server whether to process the invitation message comprises:

receiving from a central datastore a first tuple, wherein the first tuple comprises a subscriber telephone number and an assigned video termination device MAC address;

receiving from a video termination device a second tuple comprising a read video termination device MAC address and a video termination device IP address;

determining whether the assigned video termination device MAC address matches the read video termination device MAC address;

if the assigned video termination device MAC address matches the read video termination device MAC address, then creating a third tuple comprising the subscriber telephone number and the video termination device IP address;

determining whether the identifying information of the called party matches the subscriber telephone number of the third tuple; and if the identifying information of the called party matches the subscriber telephone number of the third tuple, then processing the invitation request.

37. The method for providing caller ID in a multi-region cable network of claim 36, wherein the third tuple comprises the subscriber telephone number, the read video termination device MAC address, and the video termination device IP address.

38. The method for providing caller ID in a multi-region cable network of claim 34, wherein the invitation message is forwarded by a SIP proxy server and the method further comprises:

if the called party is registered with the CID server, then sending the SIP proxy server an "OK" response message comprising an acknowledgement of the invitation message.

39. The method for providing caller ID in a multi-region cable network of claim 38 further comprising:

sending from the SIP proxy server a cancellation message to CID servers from which the "OK" response is not received.

40. The method for providing caller ID in a multi-region cable network of claim 34, wherein the CID message further comprises a destination IP address, and wherein determining if the CID message is intended for the video termination device comprises determining if the destination IP address matches the IP address of the video termination device.

41. The method for providing caller ID in a multi-region cable network of claim 34, wherein the CID message further comprises a MAC address of a destination video termination device, and wherein determining if the CID message is intended for the video termination device comprises determining if the destination MAC address matches the MAC address of the video termination device.

42. The method for providing caller ID in a multi-region cable network of claim 34, wherein the CID message further comprises a destination IP address and a MAC address of a destination video termination device, and wherein determining if the CID message is intended for the video termination device comprises determining if the destination MAC address and destination IP address match the IP and MAC address of the video termination device.

43. The method for providing caller ID in a multi-region cable network of claim 34, wherein the transmission path comprises an in-band channel.

44. The method for providing caller ID in a multi-region cable network of claim 34, wherein the transmission path comprises an out-of-band channel.

45. The method for providing caller ID in a multi-region cable network of claim 44, wherein the out-of-band channel comprises an RF channel.

46. The method for providing caller ID in a multi-region cable network of claim 44, wherein the out-of band channel comprises a DOCSIS-compliant channel.

47. The method for providing caller ID in a multi-region cable network of claim 34, wherein the video termination device comprises a set top box.

48. The method for providing caller ID in a multi-region cable network of claim 34, wherein the video termination device comprises a cable-ready video display device.

49. A system for providing caller ID service in a cable network comprising:

the cable network, wherein the cable network is adapted to convey both data and video;

a media terminal adapter (MTA) connected to the cable network, wherein the MTA comprises a subscriber telephone number associated with a subscriber, and wherein the MTA is adapted to:

receive an incoming call from a soft switch;

capture identifying information of the calling party;

create a caller ID (CID) message comprising the identifying information of the calling party;

send the caller ID message to the IP address of a video termination device associated with the subscriber via the cable network;

receive a configuration file via the cable network upon bootup, wherein the configuration file comprises a fully qualified domain name of the video termination device; and direct the CID message to the video termination device using the fully qualified domain name of the video termination device;

wherein the video termination device comprises a DOCSIS-compliant cable modem adapted to receive IP-addressed messages via the cable network and a CID client, and wherein the CID client is adapted to:

receive the CID message;

determine if the CID message is intended for the video termination device; and if the CID message is intended for the video termination device, then provide the identifying information of the calling party to the video termination device for display on a video display device.

50. The system of claim 49, wherein identifying information of the calling party comprises a caller telephone number.

51. The system of claim 49, wherein the identifying information of the calling party comprises a caller name.

52. The system of claim 49, wherein identifying information of the calling party identifies a call as originating from a facsimile machine.

53. The system of claim 49, wherein the CID client is further adapted to:
 if the CID message is not intended for the video termination device, then discard the CID message.

54. The system of claim 49, wherein the video display device is adapted to display the identifying information of the calling party and video.

55. The system of claim 49, wherein the video display device is adapted to display the identifying information of the calling party.

56. The system of claim 49, wherein the video termination device comprises a set top box.

57. The system of claim 49, wherein the video termination device is integrated into a cable-ready video display device.

58. The system of claim 49, wherein the configuration file further comprises a list of the fully qualified domain names of video termination devices associated with the subscriber telephone number, and wherein the MTA is further adapted to direct CID messages to the video termination devices using the fully qualified domain names of the video termination devices.

59. A system for providing caller ID service in a cable network comprising:
 the cable network, wherein the cable network is adapted to convey both data and video;
 a video termination device (VTD) connected to the cable network, wherein the VTD comprises a CID client, a DOCSIS-compliant cable modem and a media terminal adapter (MTA), wherein the MTA comprises a subscriber telephone number associated with a subscriber, and wherein the MTA is adapted to:
  receive an incoming call from a soft switch;
  capture identifying information of the calling party;
  create a caller ID (CID) message comprising the identifying information of the calling party; and
  send the caller ID message to the CID client;
  receive a configuration file via the cable network upon bootup, wherein the configuration file comprises a fully qualified domain name of the video termination device; and
  direct the CID message to the video termination device using the fully qualified domain name of the video termination device; and
 wherein the CID client is adapted to:
  receive the CID message; and
  provide the identifying information of the calling party to the video termination device for display on a video display device.

60. The system of claim 59, wherein identifying information of the calling party comprises a caller telephone number.

61. The system of claim 59, wherein the identifying information of the calling party comprises a caller name.

62. The system of claim 59, wherein identifying information of the calling party identifies a call as originating from a facsimile machine.

63. The system of claim 59, wherein the video display device is adapted to display the identifying information of the calling party and video.

64. The system of claim 59, wherein the video display device is adapted to display the identifying information of the calling party.

65. The system of claim 59, wherein the video termination device comprises a set top box.

66. The system of claim 59, wherein the video termination device is integrated into a cable-ready video display device.

67. The system of claim 59, wherein the configuration file further comprises a list of the fully qualified domain names of video termination devices associated with the subscriber telephone number, and wherein the MTA is further adapted to direct CID messages to the video termination devices using the fully qualified domain names of the video termination devices.

\* \* \* \* \*